Nov. 17, 1953 W. LAYLAND 2,659,355
COMBUSTION CHAMBER OF INTERNAL-COMBUSTION ENGINES
Filed Dec. 11, 1951 3 Sheets-Sheet 1

William Layland,
Inventor
By Scrivener + Parker,
Attorneys

Nov. 17, 1953  W. LAYLAND  2,659,355
COMBUSTION CHAMBER OF INTERNAL-COMBUSTION ENGINES
Filed Dec. 11, 1951  3 Sheets-Sheet 2

Patented Nov. 17, 1953

2,659,355

UNITED STATES PATENT OFFICE 2,659,355

COMBUSTION CHAMBER OF INTERNAL-COMBUSTION ENGINES

William Layland, Kings Heath, Birmingham, England, assignor to The Austin Motor Company Limited, Northfield, Birmingham, England Application December 11, 1951, Serial No. 261,071

5 Claims. (Cl. 123—191)

It is a generally accepted theory that when a charge is compressed and fired in an internal combustion engine cylinder by means of a spark plug, a flame front advances from the vicinity of the spark plug into the combustion chamber and thereby compresses the gas in front of it. If the temperature of the "end" gas is raised too high by compression from the advancing flame front, the end gas is prone to ignite almost instantaneously, causing the phenomenon of detonation commonly termed "pinging." It is also generally accepted that the above condition can be alleviated by introducing turbulence of the charge during the period immediately preceding the ignition; and with a view to obtaining such turbulence the valves have been placed in a chamber of smaller lateral dimensions than those of the cylinder, leaving a flat under surface of the cylinder head surrounding the entrance to the said chamber whereby the piston, on its upstroke and especially near the end thereof, will cause a violent flow of charge to be forced from the cylinder into the chamber where the valves and the spark plug are situated. This effect is known as "squish."

This invention has for its object to provide improved means, in an internal combustion engine, for obtaining "squish," and also for obtaining improved means for preventing excessive heat due to compression caused by the advancing flame.

According to the present invention, in an internal combustion engine there is provided a metal plate located between the piston and the spark plug and valves, which plate extends transversely into the passage through which the charge must pass under the action of the piston, so as to restrict said passage.

The plate may be separate from the metal of the cylinder or the head, or it may be formed integrally with the cylinder head. Where the plate is separate it will preferably be of metal of good thermal conductivity, for example, of copper.

The plate may extend the whole way across the passage and have formed in it one or more holes for the charge to pass through, said hole or holes being in alignment, axially of the cylinder, with the heads of the valves.

In any construction of the plate it may be so formed as to define the edge of an elongated opening which when projected axially of the cylinder into the combustion chamber in the head defines thereon an area which includes the heads of both valves.

Embodiments of the invention will now be described with reference to the accompanying drawings, in which.

Figure 1:
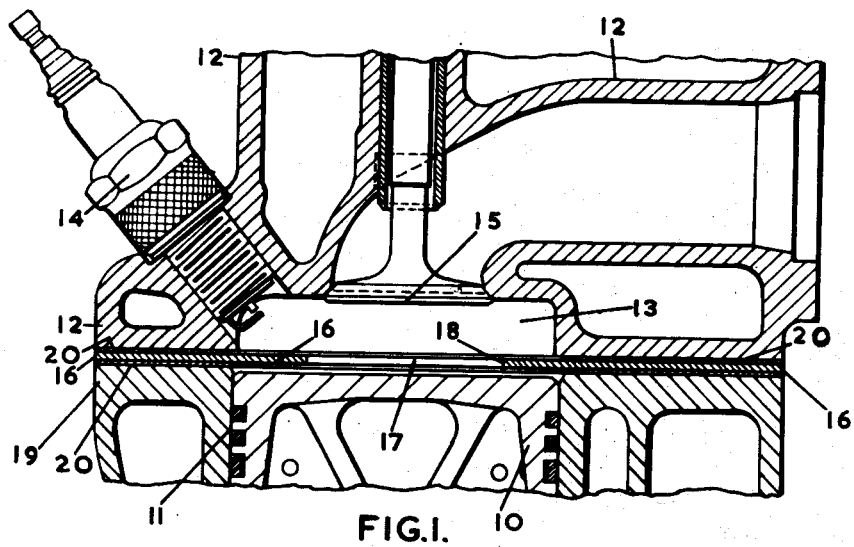
Fig. 1 is a fragmentary sectional end elevation showing one cylinder of an internal combustion engine.
Figure 2:
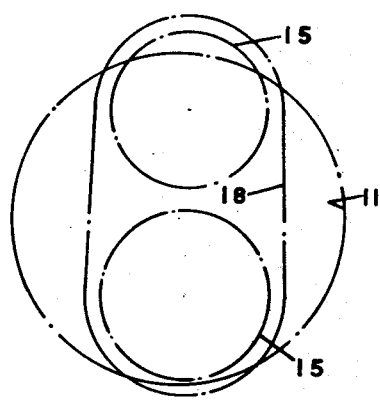
Fig. 2 is a diagrammatic plan showing the relationship of various parts shown in Fig. 1.

Referring to Figs. 1 and 2 of the drawings, the piston 10 is shown in Fig. 1 as at top-dead-centre of its stroke in the cylinder 11, and in the cylinder head 12 are seen the combustion chamber 13, a spark plug 14, and one of the usual two inlet and exhaust poppet valves 15. A metal plate 16, preferably of copper, is located between the piston 10, and the spark plug 14 and valves 15, the said plate extending transversely into the passage 17 through which the charge must pass from the cylinder 11 into the combustion chamber 13 under the action of the piston 10, so that said passage is restricted by the plate 16. The plate 16 is formed with a through hole 18 of elongated form, which hole, as seen most clearly in Fig. 2, is of such shape and size that when its edge is projected axially of the cylinder into the combustion chamber, it defines thereon an area which includes the heads of both valves 15.

The plate 16, as shown in Fig. 1, is conveniently located and held in place by positioning it with those portions which do not project transversely to restrict the passage 17 located between the cylinder block 19 and head 12, packing gaskets 20 being shown at both sides of the plate 16. With this arrangement a single plate 16, with holes 18 appropriately placed for each cylinder, is provided for one engine.

Figure 3:
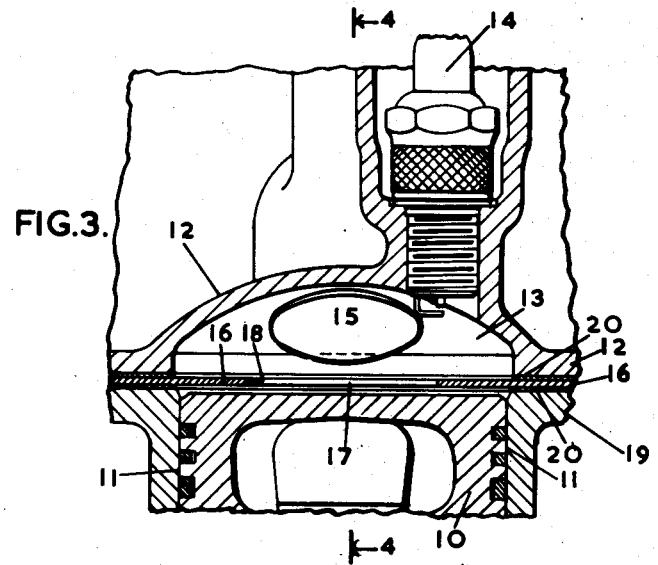
Fig. 3 is a similar view to Fig. 1, but shows a cylinder head of a different type to that shown in Fig. 1.
Figure 4:
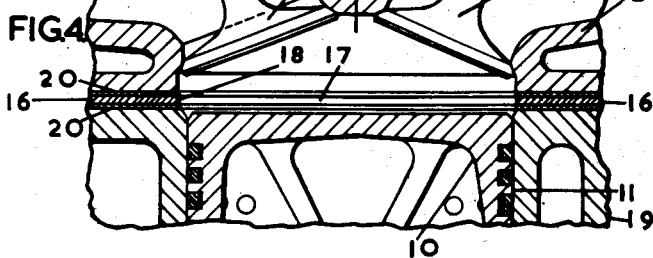
Fig. 4 is a sectional view on the line 4—4 of Fig. 3.
Figure 5:
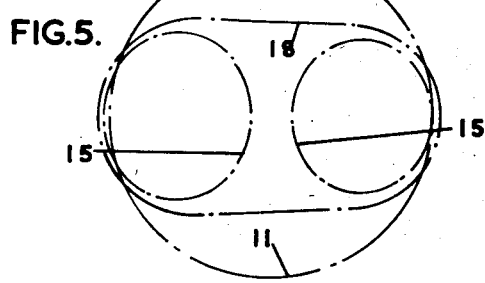
Fig. 5 is a diagrammatic plan showing the relationship of various parts shown in Fig. 4.

In Figs. 3 and 4, the engine shown is provided with the type of cylinder head generally known as the hemispherical type, referring to the shape of the combustion chamber, but otherwise the application of the invention is as already described with reference to Figs. 1 and 2, so like parts bear like reference numerals.

Figure 6:
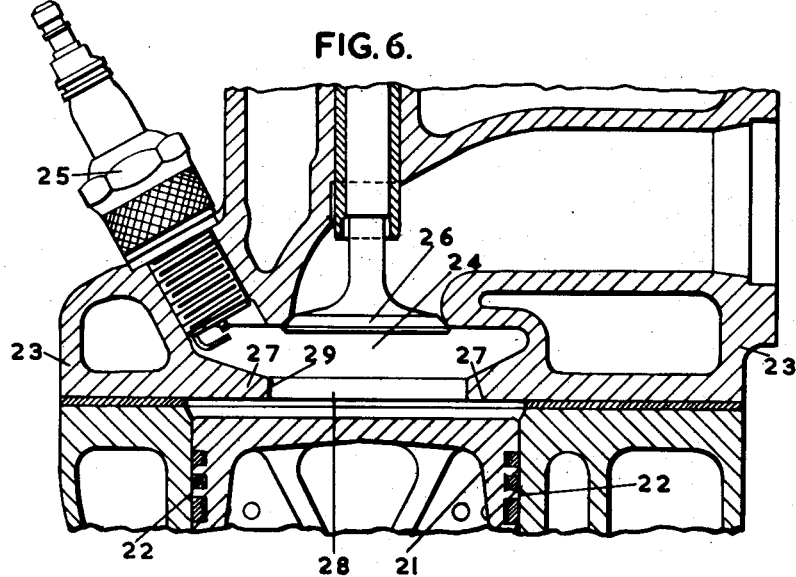
Fig. 6 is a similar view to Fig. 1, but shows an alternative construction.
Figure 7:
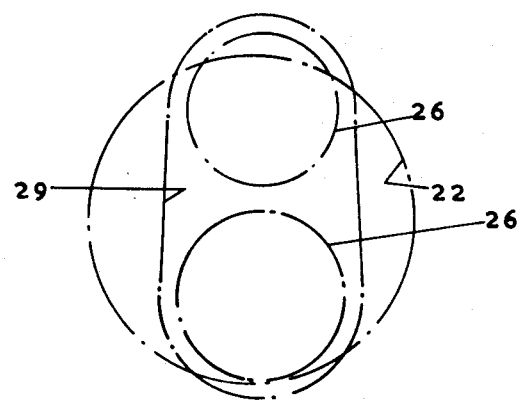
Fig. 7 is a diagrammatic plan showing the relationship of various parts shown in Fig. 6.

Referring now to Figs. 6 and 7, the piston 21 is shown in Fig. 6 at top-dead-centre of its stroke in the cylinder 22, and in the cylinder head 23 are seen the combustion chamber 24, a spark plug 25 and one of the usual two inlet and exhaust poppet valves 26.

A plate 27 formed integrally with the cylinder head 23 is located between the piston and the spark plug and valves, which plate 27 extends transversely into the passage 28 through which the charge must pass from the cylinder 22 into the combustion chamber 24 under the action of the piston 21.

The plate 27 is formed with a through hole 29 of elongated form, and of such size and shape that when its edge is projected axially of the cylinder, as previously described with reference to Fig. 2, it defines an area which includes the heads of both valves 26, as can be seen clearly in the diagrammatic plan Fig. 7, which indicates the relative positions of the cylinder, valves and opening 29 in the plate 27.

In the embodiments shown, the effect of the plates 16 and 27 respectively is to produce "squish" and minimise tendency to "pinging," whilst at the same time offering a minimum of restriction to the free flow of gases through the valves.

Further, with the separate plate 16 of metal of high thermal conductivity such as copper, tendency to "pinging" is further reduced since the plate acts in the manner of a cooling fin to conduct away excessive heat, a feature which is also present, but not to such a great degree, where the plate is integral with the cylinder head.

Having fully described my invention, what I claim and desire to secure by Letters Patent is:

1. In an internal combustion engine having at least one piston and cylinder and a cylinder head having a combustion chamber containing a pair of valves and a spark plug for each piston and cylinder, a metal plate located between the piston and the spark plug and valves, said plate extending transversely relative to the axis of the cylinder and provided with a single opening defining a restricted passage through which the charge must pass under the action of the piston, said opening, when projected axially, defining an area which includes the heads of both of said valves.

2. In an internal combustion engine having at least one piston and cylinder and a cylinder head having a combustion chamber containing a pair of valves and a spark plug for each piston and cylinder, a separate plate of metal of good thermal conductivity located between the piston and the spark plug and valves, and extending transversely relative to the axis of the cylinder, and provided with a single opening therein to afford a restricted passage for the charge to pass through, said opening, when projected axially, defining an area which includes the heads of both of said valves.

3. In an internal combustion engine having at least one piston and cylinder and a cylinder head having a combustion chamber containing a pair of valves and a spark plug for each piston and cylinder, a separate plate of metal of good thermal conductivity gripped between the cylinder head and the cylinder block, said plate being provided with a single opening, for registering with each cylinder, and each opening being of less area than the cross-sectional area of the cylinder, so that portions of said plate extend transversely into the passage through which the charge must pass under the action of the piston and restrict said passage, each opening, when projected axially, defining an area which includes the heads of both valves for the respective cylinder.

4. In an internal combustion engine having at least one piston and cylinder and a cylinder head having a combustion chamber containing a pair of valves and a spark plug for each piston and cylinder, a metal plate located between the piston and the spark plug and valves, said plate extending transversely relative to the axis of the cylinder the whole way across the passage between the cylinder and the combustion chamber and having a single opening therein the edge of which when projected axially of the cylinder into the combustion chamber in the head, defines thereon an area which includes the heads of the valves.

5. In an internal combustion engine having at least one piston and cylinder and a cylinder head having a combustion chamber containing a pair of valves and a spark plug for each piston and cylinder, a separate plate of metal of good thermal conductivity gripped between the cylinder head and cylinder block, said plate being provided with single openings each registering with a cylinder and each opening being of less area than the cross-sectional area of the cylinder, so that portions of said plate extend transversely to afford a restricted passage through which the charge must pass under the action of the piston, the edge of each opening when projected axially of the cylinder into the combustion chamber in the head defining thereon an area which includes the heads of the valves.

WILLIAM LAYLAND.

References Cited in the file of this patent

FOREIGN PATENTS

| Number | Country | Date |
|---|---|---|
| 862,732 | France | Dec. 16, 1940 |